US012809917B1

(12) United States Patent
Hellsten

(10) Patent No.: US 12,809,917 B1
(45) Date of Patent: Nov. 24, 2026

(54) ASSET RELATIONSHIP SYSTEM AND METHOD

(71) Applicant: NTT SECURITY HOLDINGS CORPORATION, Tokyo (JP)

(72) Inventor: Robin Hellsten, Tokyo (JP)

(73) Assignee: NTT Security Holdings Corporation (JP)

( * ) Notice: Subject to any disclaimer, the term of this patent is extended or adjusted under 35 U.S.C. 154(b) by 78 days.

(21) Appl. No.: 18/799,668

(22) Filed: Aug. 9, 2024

(51) Int. Cl.
*G06F 16/901* (2019.01)
*G06F 16/215* (2019.01)

(52) U.S. Cl.
CPC ........ *G06F 16/9024* (2019.01); *G06F 16/215* (2019.01)

(58) Field of Classification Search
CPC . G06F 16/9024; G06F 16/215; G06F 16/9027
See application file for complete search history.

(56) References Cited

U.S. PATENT DOCUMENTS

| | | | |
|---|---|---|---|
| 6,575,902 | B1 | 6/2003 | Burton |
| 7,225,343 | B1 | 5/2007 | Honig et al. |
| 7,912,698 | B2 | 3/2011 | Stainikov et al. |
| 8,135,718 | B1 | 3/2012 | Das et al. |
| 8,402,543 | B1 | 3/2013 | Ranjan et al. |
| 8,510,830 | B2 | 8/2013 | Reilly |
| 8,762,298 | B1 | 6/2014 | Ranjan |
| 9,144,389 | B2 | 9/2015 | Srinivasan et al. |
| 9,183,387 | B1 | 11/2015 | Altman et al. |
| 9,674,298 | B1 | 6/2017 | Edwards |
| 9,674,880 | B1 | 6/2017 | Egner et al. |
| 9,769,189 | B2 | 9/2017 | Mohaisen et al. |
| 9,781,160 | B1 | 10/2017 | Irimie |
| 9,787,640 | B1 | 10/2017 | Xie et al. |
| 10,566,084 | B2 | 2/2020 | Kataoka |
| 10,742,669 | B2 | 8/2020 | Takahashi et al. |
| 2003/0137109 | A1 | 7/2003 | Vancura |
| 2004/0128535 | A1 | 7/2004 | Cheng |
| 2006/0187060 | A1 | 8/2006 | Colby |
| 2006/0189377 | A1 | 8/2006 | Gomez et al. |
| 2007/0078936 | A1 | 4/2007 | Quinlan et al. |

(Continued)

FOREIGN PATENT DOCUMENTS

| | | | |
|---|---|---|---|
| CN | 118093632 | A | 5/2024 |
| JP | 2003242124 | A | 8/2003 |

(Continued)

OTHER PUBLICATIONS

Kegelman,J.C., et al., entitled "Insights into vehicle trajectories at the handling limits: analyzing open data from racecar drivers;Taylor & Francis, Vehicle System Dynamics".

(Continued)

*Primary Examiner* — Ann J Lo
(74) *Attorney, Agent, or Firm* — Manatt, Phelps & Phillips, LLP

(57) ABSTRACT

An asset management system and method store assets and related data for the asset so that it can be queried. In one embodiment, the asset and the related data may be stored in a graph database in which each node in the graph database stores a piece of asset data and each edge in the graph database encodes a relationship between the two nodes/piece of asset data to which it is connected.

18 Claims, 12 Drawing Sheets

(56) References Cited

U.S. PATENT DOCUMENTS

| | | | |
|---|---|---|---|
| 2007/0256141 | A1 | 11/2007 | Nakano |
| 2007/0298874 | A1 | 12/2007 | Baerlocher |
| 2007/0298875 | A1 | 12/2007 | Baerlocher |
| 2008/0076515 | A1 | 3/2008 | Baerlocher et al. |
| 2009/0066521 | A1 | 3/2009 | Atlas et al. |
| 2009/0280891 | A1 | 11/2009 | Filipour et al. |
| 2009/0319457 | A1 | 12/2009 | Cheng et al. |
| 2010/0066509 | A1 | 3/2010 | Okuizaimi et al. |
| 2010/0286572 | A1 | 11/2010 | Moersdorf et al. |
| 2011/0118011 | A1 | 5/2011 | Filipour |
| 2012/0005755 | A1 | 1/2012 | Kitazawa et al. |
| 2013/0074186 | A1 | 3/2013 | Muttik |
| 2013/0195326 | A1 | 8/2013 | Bear |
| 2014/0153478 | A1 | 6/2014 | Kazmi et al. |
| 2015/0088791 | A1 | 3/2015 | Lin et al. |
| 2017/0063893 | A1 | 3/2017 | Franc et al. |
| 2017/0092068 | A1 | 3/2017 | Vann |
| 2017/0251005 | A1 | 8/2017 | Niv |
| 2017/0318033 | A1 | 11/2017 | Holland et al. |
| 2017/0337776 | A1 | 11/2017 | Herring |
| 2017/0374392 | A1* | 12/2017 | Hart ........................ G06F 16/74 |
| 2018/0047253 | A1 | 2/2018 | Vann |
| 2018/0069885 | A1 | 3/2018 | Patterson |
| 2018/0082530 | A1 | 3/2018 | Upton et al. |
| 2018/0082533 | A1 | 3/2018 | Hallerbach et al. |
| 2018/0083988 | A1 | 3/2018 | Kataoka et al. |
| 2018/0101559 | A1 | 4/2018 | Taylor et al. |
| 2018/0329958 | A1 | 11/2018 | Choudhury |
| 2019/0052652 | A1 | 2/2019 | Takahashi |
| 2019/0132342 | A1 | 5/2019 | Arlitt et al. |
| 2019/0305957 | A1 | 10/2019 | Reddy et al. |
| 2020/0358815 | A1 | 11/2020 | Dalek et al. |
| 2020/0409931 | A1 | 12/2020 | Zang et al. |
| 2022/0067011 | A1 | 3/2022 | Yue et al. |
| 2024/0289388 | A1* | 8/2024 | Tang ..................... G06F 16/172 |
| 2025/0028928 | A1* | 1/2025 | Crisan .................... G06N 3/084 |

FOREIGN PATENT DOCUMENTS

| | | | |
|---|---|---|---|
| JP | 2007318745 | A | 12/2007 |
| JP | 2008049602 | A | 3/2018 |
| JP | 2018148267 | A | 9/2018 |
| WO | W02008117544 | A | 10/2008 |
| WO | W02012075336 | A1 | 6/2012 |
| WO | W02018140335 | A1 | 8/2018 |
| WO | W02019032745 | A1 | 2/2019 |

OTHER PUBLICATIONS

Kegelman,J.C., et al., Cont.—dated Nov. 3, 2016, 18 pages.

Theodosis et al., "Nonlinear Optimization of a Racing Line for an Autonomous Racecar Using Professional Driving Techniques", dated Oct. 2012,7 Pages,Citation and abstract.

Theodosis et al., Cont.—Theodosis retrieved from the web at: http://www.researchgate.net/publication/267650184.

Tulabanuhula, T. et al. "Tire Changes, Fresh Air, and Yellow Flags: Challenges in Predictive Analytics for Professional Racing" MIT, dated Jun. 2014(17 pages.).

Lee, J .IL et al., Development of a novel Tympanic temperature monitoring system for GT car racing athletes—Abstract Only—pp. 2062-2065, dated 20] 3.

Lee, J .IL et al., Cont.—(3 pages.) Lee retrieved from the web at https://link.springer.com/chapter/10.1007/978-3-642-29305-4 541.

Kataoka et al., "Mining Muscle Use Data for Fatigue Reduction in IndyCar," MIT Sloan Sports Analytics Conference (Mar. 4, 2017).

Kataoka et al., Cont.—pp. 1-12. Kataoka retrieved from the internet. http://www.sloansportsconference.com/wp-content/uploads/2017/02/1622.pdf.

Malik et al., "Automatic training data cleaning for text classific-ation." In: 2011 IEEE 11th international conference on data mining workshops.

Malik et al., Cont.—Dated: Dec. 11, 2011, Malik retrieved on Feb. 22, 2022, entire document, http://www.cs.columbia.edu/~hhm2104/papers/atdc.pdf.

Chawla et al., "SMOTE: synthetic minority over-sampling technique." In; Journal of artificial intelligence research. Dated: Jun. 2, 2002, 37 pages.

Chawla et al., Chawla retrieved on Feb. 22, 2022 at https://patents.google.com/patent/US 10887324B2/en.

Yen et al., "Cluster-based under—sampling approaches for imbalanced data distributions." In:Expert Systems with Applications.

Yen et al., Cont.—Dated: Apr. 2009, 10 pages, Yen retrieved at: https://sci2s.ugr.es/keel/pdf/specific/aiticulo/yen_cluster_2009.pdf.

Analytics Vidhya. "Imbalanced Data: How to handle Imbalanced Classification Problems in machine learning?" In: Dated: Mar. 17, 2017,17 pages.

Analytics Vidhya. Cont.—retrieved at: https://www.analyticsvidhya.com/blosg/2017/03/imbalanced-data-classification/.

Website Traffic, Statistics and Analytics @, Alexa—Webpage: https://www.alexa.com/siteinfo, retrieved from internet Jan. 30, 2018, 5 pages.

Kegelman, J.C., et al., entitled "Insights into vehicle trajectories at the handling limits:analyzing open data from racecar drivers; Taylor & Francis, Vellicle System Dynamics" dated Nov. 3, 2016, 18 pages.

Theodosis et al., "Nonlinear Optimization of a Racing Line for an Autonomous Racecar Using Professional Driving Techniques", dated Oct. 2012, 7 pages, Citation and abstract, Theodosis retrieved from the web at: https://www.researchgate.net/publication/267650184.

Tulabandhula, T. et al. "Tire Changes, Fresh Air, and Yellow Flags: Challenges in Predictive Analytics for Professional Racing" MIT, dated Jun. 2014 (17 pages.).

Takagahara, K. et al.: "hitoe"—A Wearable Sensor Developed through Crossindustrial Collaboration, NTT Technical Review, dated Sep. 4, 2014 (5 pages.).

Lee, J.H., et al., Development of a novel Tympanic temperature monitoring system for GT car racing athletes—Abstract Only—pp. 2062-2065, dated 2013, (3 pages. ), LEE retrieved from the web at https://link.springer.com/chapter/10. 1007 /978-3-642-29305-4_541.

Kataoka et al, "Mining Muscle Use Data for Fatigue Reduction in IndyCar," MIT Sloan Sports Analytics Conference (Mar. 4, 2017), pp. 1-12., Kataoka retrieved from the Internet. http://www.sloansportsconference.com/wp-content/uploads/2017/02/1622.pdf.

Malik et al. "Automatic training data cleaning for text classification." In: 2011 IEEE 11th international conference on data mining workshops. Dated : Dec. 11, 2011, Malik retrieved on Feb. 22, 22, entire document, http://www.cs.columbia.edu/~hhm2104/papers/atdc.pdf.

Chawla et al., "SMOTE: synthetic minority over-sampling technique." In: Journal of artificial intelligence research. Dated: Jun. 2, 2002, 37 pages, Chawla retrieved on Feb. 22, 2022 at https://patents.google.com/patent/US 10887324B2/en.

Yen et al., "Cluster-based under—sampling approaches for imbalanced data distributions." In: Expert Systems with Applications. Dated: Apr. 2009, 10 pages, Yen retrieved at: https:/ /sci2s.ugr.es/keel/pdf/specific/articulo/yen_cluster_2009.pdf.

Analytics Vidhya. "Imbalanced Data: How to handle Imbalanced Classification Problems in machine learning?" In: Dated:Mar. 17, 2017, 17 pages., retrieved at: https://www.analyticsvidhya.com/blog/2017/03/imbalanced-data-classification/.

Fullmer, et al., "The OSU flow-tools Package and Cisco Netflow Logs", 2000 LISA XIV—Dec. 3-8, 2000—New Orleans, LA, pp. 291-304.

Fusco, et al., "Real-time creation of bitmap indexes on streaming network data" The VLDB Journal (2012) 21:287-307.

* cited by examiner

```
> curl -L -X DELETE 'http://localhost:8080/deletenode' \
-H 'Content-Type: application/json' \
-d '{"customer":"example-customer", "value":"delete_me", "type":"hostname"}'
{"status":"ok"}
```

FIGURE 6

```
> curl -L 'http://localhost:8080/getnode?customer=example-customer&value=delete_me&type=hostname' | jq .
  % Total    % Received % Xferd  Average Speed   Time    Time     Time  Current
                                 Dload  Upload   Total   Spent    Left  Speed
100    28  100    28    0     0  16288      0 --:--:-- --:--:-- --:--:-- 28000
{
  "status": "Asset not found"
}
```

FIGURE 7

ASSET RELATIONSHIP SYSTEM AND METHOD

FIELD

The disclosure relates generally to managing Information Technology (IT) assets and in particular to determining and storing relationships between related IT asset pieces of data.

BACKGROUND

When working with or trouble shooting an issue for an Information Technology (IT) or internet protocol (IP) system or network or environment, each piece of information/data about an asset can be extremely valuable and useful to an analyst. An asset may be a computer, a server, a laptop computer, a user, etc. that are part of the IT or IP system being worked on or troubleshooted by the analyst. Each asset has a plurality of pieces of data that define various aspects/characteristics of the asset or the relationship of the asset to other assets. Only having one piece of "asset information" available at any given time could make it more difficult to see the full picture about that asset. For example, an analyst might know that a computer with hostname "firewall_wa_02" is expected to be offline due to maintenance, but then some other system generates and sends a warning that "firewall 10.7.5.2" also has gone offline. The analyst based on the hostname information alone cannot determine, for example, that "firewall_wa_02" is the same computer as "firewall 10.7.5.2." An asset relationship system and method that was able to associate/relate the pieces of asset information for an asset to each other would be very helpful and desirable and would, in the example above, allow the analyst to determine that "firewall wa_02" is in fact the same computer as "firewall 10.7.5.2".

Thus, it is desirable to provide an asset relationship system and method and it is to this end that the disclosure is directed.

BRIEF DESCRIPTION OF THE DRAWINGS

FIG. 6 illustrates more details of deleting the asset;

FIG. 7 illustrates a process of confirming that the deleted asset is no longer viewable in the system;

DETAILED DESCRIPTION OF ONE OR MORE EMBODIMENTS

The disclosure is particularly applicable to an asset relationship system and method for IT/IP (Information Technology/Internet Protocol) assets that uses a graph database and it is in this context that the disclosure will be described. It will be appreciated, however, that the system and method has greater utility since the system and method can used to discover and store other types of assets and their relationships to other assets. Furthermore, the system and method may use other types of storage than the graph database to store the set of related assets. In the example below, the internet protocol (IP) assets may be a hostname, a IP address, a network, a piece of software and a username. One skilled in the art would understand that additional or fewer assets may be used by the system within the scope of the disclosure.

In addition to using the system by an analyst to diagnose/address an IT asset issue, the asset system and method may be used to make sure software is up to date. For example, an administrator could make a request for all hosts which have "softwareX" installed, and then have the version of that software as a tag, and then loop over the results and print out all hosts which are not on a given version. Thus, when there is a new vulnerability, the administrator/user could have an overview of what hosts might be vulnerable, see if there is any pattern (maybe you have added "location" as a tag), and then see that all the systems are vulnerable in department X or Y, or in Spain.

Figure 1:
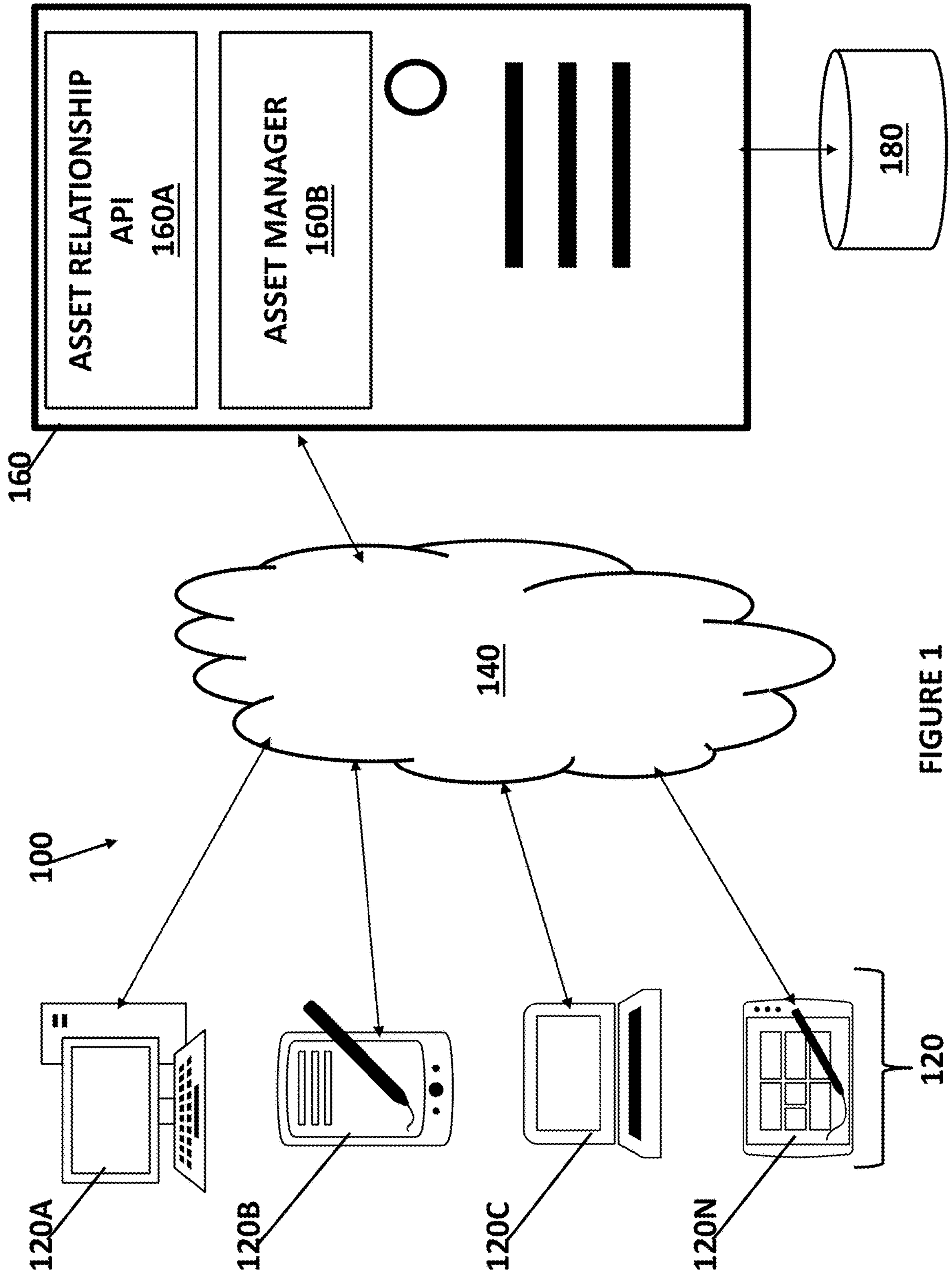
FIG. 1 illustrates an example of an asset relationship system.

FIG. 1 illustrates an example of an asset relationship system 100 that has been implemented using an application programming interface (API) type architecture. It should be understood, however, that the system and method may be implemented in other manners, methods or architectures that are all within the scope of the disclosure. The system 100 may have one or more computing devices 120 that may use a connection 140 to access an asset relationship application programming interface (API) 160A in a backend computer 160. Each computing device 120 may be used by a user to submit a request for related information for a particular asset through the API 160A and an asset manager 160B may return the related information for the asset to the user using the API 160A. For example, in the IP asset example, the user may submit a hostname of a computer that is an IP asset and the system 100 may return, to the user, one or more of an IP address, network, software and username related to the particular IP asset. The API 160A may be a plurality of lines of code/instructions executed by a processor of the backend computer 160 that handle validation of inputs, determining an appropriate database based on the request and a look up of the pieces of data for the asset in the graph database.

The one or more computing devices 120 may be various types of computers such as a desktop computer or terminal 120A, a smartphone device 120B, such as an Apple® iPhone® or an Android® based operating system device, a laptop 120C and/or a tablet computer 120N or any other computer that is capable of interacting with the API 160A. Each computing device 120 may have at least one processor, memory, wireless or wired communication circuits and a display. Each computing device 120 may have a well known browser application or other application that is a plurality of lines of instructions/computer code that are executed by the processor to interface with the API 160A.

The connection 140 may be a wired and/or a wireless connection that has a connection protocol, such as TCP/IP, and a data/communications protocol, such as the Simple Object Access Protocol (SOAP), Remote Procedure Call (RPC), Representational State Transfer (REST), etc. to access the API 160A. For example, the connection 140 may be one or more of a wired network, a wireless network, a cellular data network, a computer data network and the like.

The backend 160 may be one or more computer systems implemented using one or more computing resources such as cloud computing resources (Amazon® AWS® or Microsoft® Azure®), a server computer, a blade server, an application server, a database server and the like. The backend 160 may include at least one or more processors and a memory. As described above, the backend 160 may support the asset relationship API 160A and exchange data with the API 160A and also hosts/has the asset manager 160B that manages the asset data and interfaces with the asset storage 180 that may be a hardware or software storage and may be a database and more specifically, in one embodiment, a graph database. The API 160A and the asset manager 160B may be implemented using a plurality of lines of computer code/instructions stored in the memory of the backend 160 and executed by the processor of the backend 160 to configure the processor to perform the processes of the asset manager 160B and/or the API 160A. The asset manager 160B may manage the asset information for each asset and may include processes to add a new asset, to add a new piece of asset information related to an already stored asset, to remove an asset or its information and/or to perform a garbage removal process that removes assets whose time in the storage 180 exceeds a time to life (TTL) threshold as described in more detail below. The asset manager 160B may also enforce and assign the TTL to each asset or piece of data for an asset.

The asset manager 160B may further include (not shown in FIG. 1) one or more artificial intelligence modules/elements, such as an large language model appropriately trained for the asset data and connected to the storage, that could be used as a chatbot/agent to answer user questions about the asset data. For example, a system of the asset system that lists each or all of the assets may be then able to respond to questions such as "what network(s) are potential guest networks?" or "what network has the most outdated software?".

The asset storage 180 in FIG. 1 may be a graph database and may have one or more nodes and one or more edges that connect the one or more nodes to each other. Each node of the graph database may store data about a particular asset. Each edge in the graph database may be used to connect two or more nodes to each other wherein the two or more nodes have a relationship with each other such as two or more asset characteristics/variables of an asset as discussed in this disclosure. Thus, each edge encodes a relationship between the two nodes connected by the edge. Note that a node for a new asset may also be added to the asset storage 180.

Thus, as shown in FIG. 1, the system may have one or more users/actors/components/modules that would add data from an arbitrary or other system (as discussed below) into the asset relationship system. One or more users (using each device 120 and the asset relationship API 160A) could then retrieve the data about a queried asset.

In a preferred implementation, the API 160A may be written in golang, using a web framework called "gin". The data may be written into and stored in a commercially available graph database "arangoDB". The backend 160 may run in kubernetes in Azure, but the backend 160 could also be hosted locally. In the IP asset example, the type of assets may be "ip", "hostname", "username", "software" and "network" and the list of assets may be expanded. For a different type of asset, there may be a different set of asset characteristics as would be understood by those skilled in the art.

Figure 2:
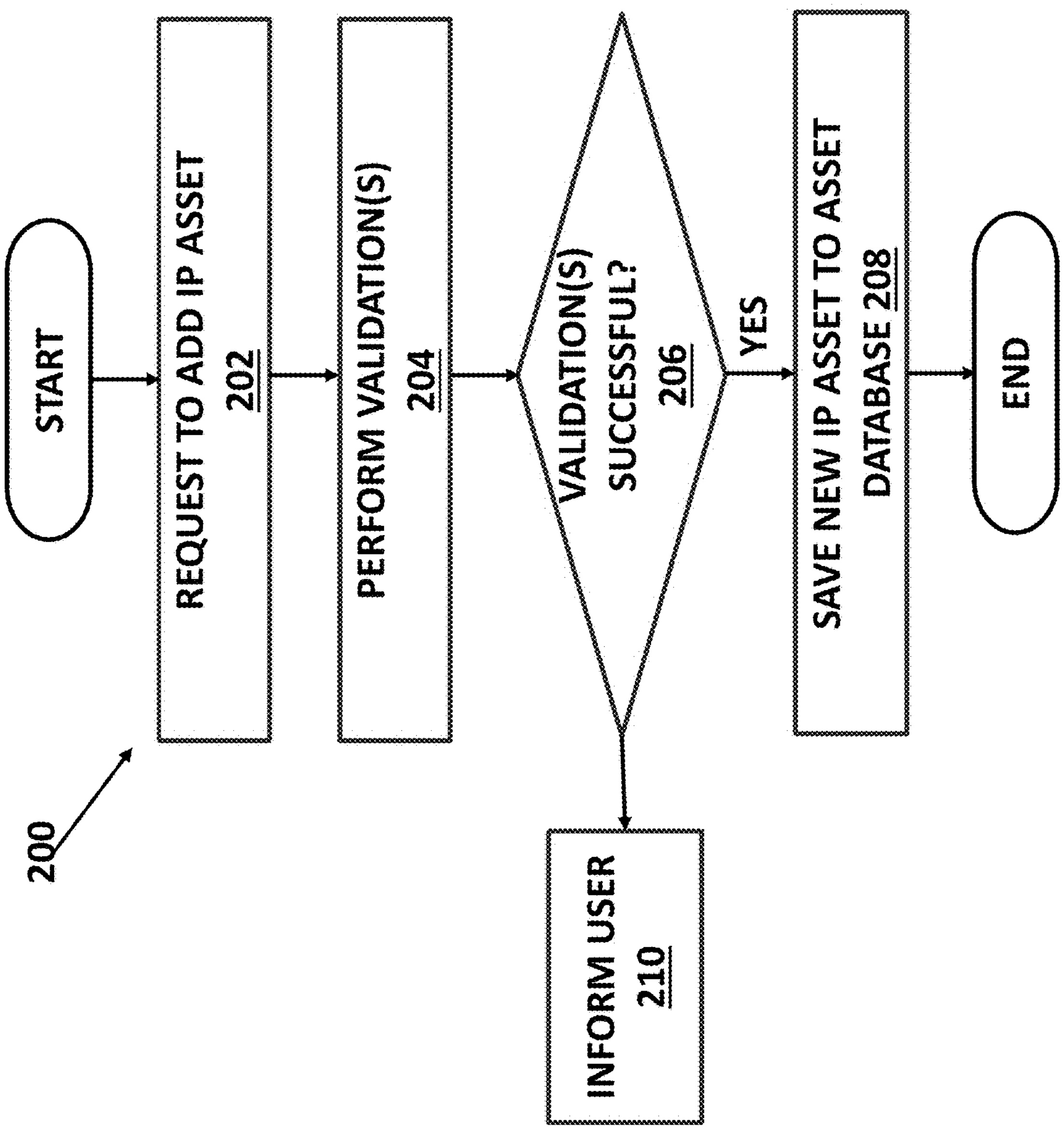
FIG. 2 illustrates a method for adding a new asset to an asset relationship storage.

FIG. 2 illustrates a method 200 for adding a new asset to the asset relationship storage. The method 200 may be implemented by the system shown in FIG. 1 including the asset manager 160B and storage 180, but may be implemented in other manners that are within the scope of the disclosure. For illustration, the method is described in the context of IP assets, but the method may be performed on various different assets. A request to add a new asset (202), such as an IP asset, is received to add a new asset into the storage. A set of validations (204) may be performed for each different type of API call. For example, all endpoints where you add nodes perform checks so that a "customer", a "type" and a "value" are set, but there might be additional validations. For example, if the "type" is a network, there may be additional validations to confirm, for example, that the value in this field should be a valid classless inter-domain routing (CIDR) value.

The method may then determine if the new asset has successfully passed (206) the validation(s). If the new asset passes the validations, the new asset may be stored (208) in a storage, such as the storage 180 that may be preferably be a software and hardware implemented graph database. If the storage 180 is a graph database, then a new node in the graph database is created for the new asset. When the new asset is stored, it may be assigned a time to leave (TTL) value as described below. If the new asset does not pass the validation(s), the user (210) who submitted the request to add the asset is notified that the new asset is not being stored. For example, if an API request is submitted to an endpoint that add both nodes and edges between two or more items, but the request only includes one item, the storage may respond that "Item2 must have a type/value" since Item2 is missing from the request made.

In addition to the process described above, the asset manager 160B may implement a process by which a user can modify a prior request. For example, if a user requests to add a new asset and then later discovers that this newly added asset is related to a different asset already stored in the graph database, the asset manager 160B provides a process to relate those assets. Specifically, the asset manager 160B may have a process to add an edge or edges in the graph database (relationship between nodes). Thus, for example, if a user discovers that the asset identified by IP address 123.123.123.123 is related to asset hostname "myhost", the user may make a request to add the edge between the two assets that indicates that the IP address and the hostname are related and are pieces of data about the same asset.

Figure 3:
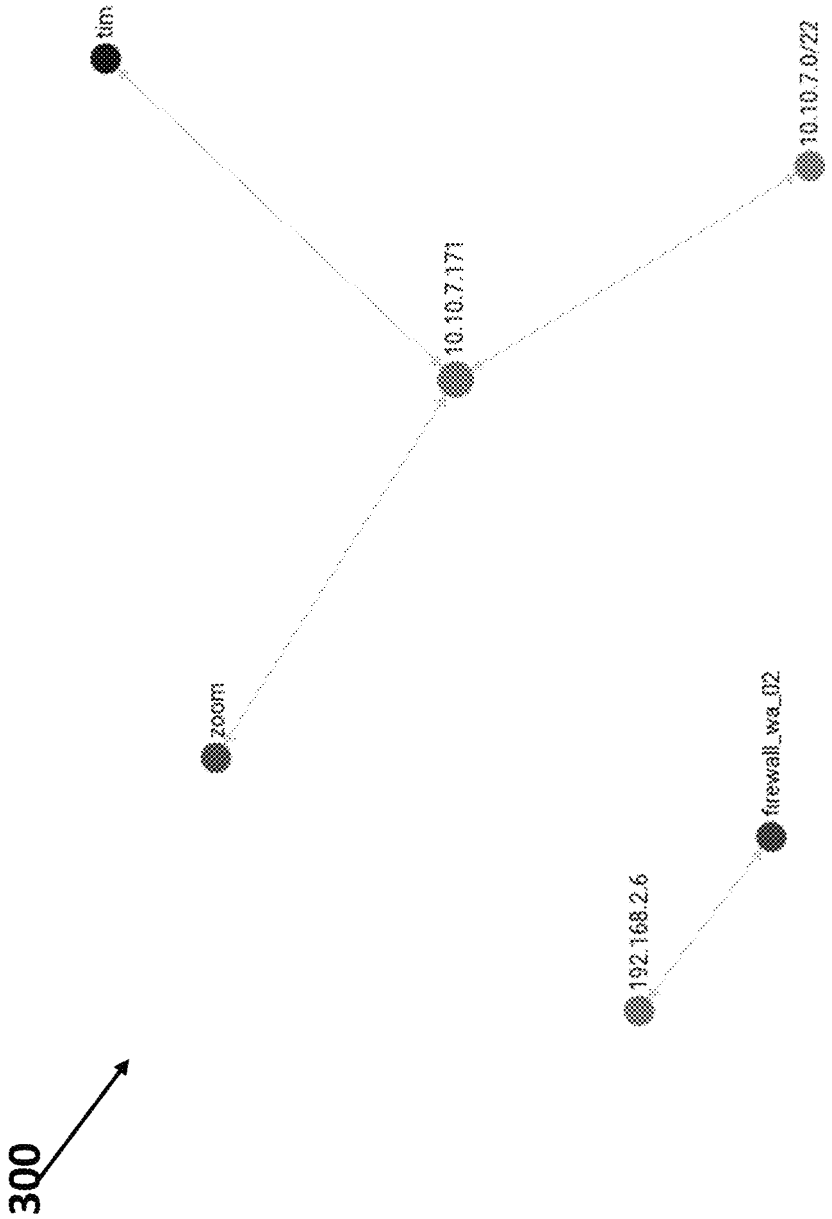
FIG. 3 illustrates an example of asset with relationships stored in the asset relationship storage.

FIG. 3 illustrates an example of an asset with relationships 300 stored in the asset relationship storage such as the storage 180 in FIG. 1. In one implementation, the asset 300 may be stored in a graph database in which each endpoint in the graph database may be an asset characteristic/variable and each edge in the graph database may be a relationship between the asset characteristics/variable. For an IP asset example, the 10.10.7.171 IP address asset may be related to a "software" zoom, the "username" tim and the network "10.10.7.0/22". Similarly a "firewall_wa_02" hostname may be related to a 192.168.2.6 IP address. An example of graph (from the arango UI) when adding 3 assets to the IP 10.10.7.171 are shown in FIG. 3.

Thus, when a user queries the asset system 100 for the 10.10.7.171 IP address asset, the other related asset characteristics/variables may be returned to the user, such as an analyst, who is better able to troubleshoot the IP asset situation based on the asset and each of the other related IP asset characteristics/variables.

The asset relationship system may have a method for loading assets and relationships in the asset relationship store when a new asset or a new asset variable that has a relationship to an asset already stored in the asset relationship store is received by the system. This ensures that the asset relationship system "learns" about each asset and can thus provide more related asset characteristics/variables over time for an asset requested by a user. The additional related asset characteristics/variables for an asset may make the user's task easier.

In order to ensure that the asset store does not contain older and likely irrelevant data about an asset or asset characteristics/variables, the asset relationship system may purge older assets after a predetermined time. For example, older assets (and the older asset related characteristics/variables) may be purged once a time to live (TTL) for the asset has expired. In one embodiment, the TTL may be seven days which is a default setting. In one embodiment, the same TTL may be applied to all types, but the TTL is configurable.

Method of Loading Assets/Relationships

The loading of each asset or new asset characteristic/variable may be done via an application programming interface (API) of the asset storage. For example, the commercially available graph database being used in one embodiment of the system may have an API that is used to load the asset or new asset characteristic/variable into the database. Alternatively, a developer could create a "module" of the asset manager 160B to retrieve data from a given other system that is a source of asset data and use the API to insert the retrieved data to the database. The other system (from which data may be retrieved by the module) may be various data sources, such as, for example, a log management system, an endpoint detection and response (EDR) product, by doing active scanning of the network, etc. in a well known manner. The use of the module that retrieves data from other system means that the asset relationship system can add new assets or new characteristics/variables of existing assets independent or in addition to the asset data that may be gathered by the system as a result of the queries made by each user. Each new asset in the graph database becomes a new node in the graph database.

The process to add an edge to relate two characteristics/variable of an asset may be performed when a user requests to "draw a line from A to B" (add an edge) via the API. When a new asset is to be added, the API 160A and manager 160B checks that the required data exists (e.g., the customer is specified, a database exists for the customer and the customer is authorized to edit the database and/or the data is valid).

Method of Removing Assets

In one embodiment, the assets may be automatically removed once the TTL has been exceeded for that asset. In addition, the asset manager 106B may also implement a method to remove an asset before reaching the TTL for the asset. In one embodiment, the removal may be performed using a DELETE request of the commercially available asset storage system. Using the API, an API call can be made to delete an edge or a node. If a node is deleted, the one or more edge(s) connected to that deleted node are not automatically deleted.

Figure 4:
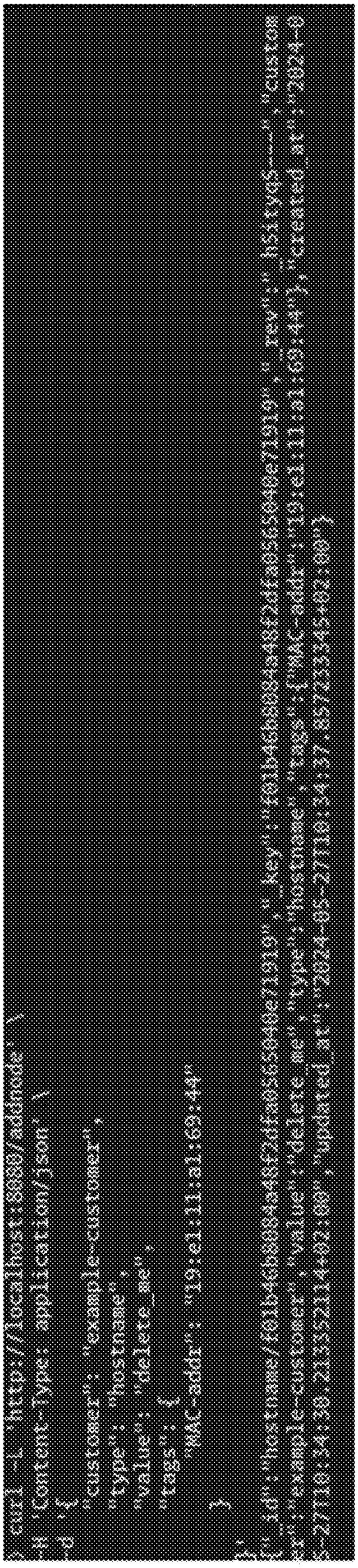
FIG. 4 illustrates more details for adding a node.

This method may be performed on any asset at any time (not just when the TTL is exceeded). The example method to remove an asset is shown using code shown in the figures for the exemplary "Arango_db" graph database. FIG. 4 shows a example "delete_me" hostname asset being created which will then be removed before its TTL has expired. Thus, FIG. 4 illustrates one example of a method for removing the asset from the asset relationship storage, but the method for removing the asset may be performed using other techniques that are within the scope of the disclosure.

Figure 5:
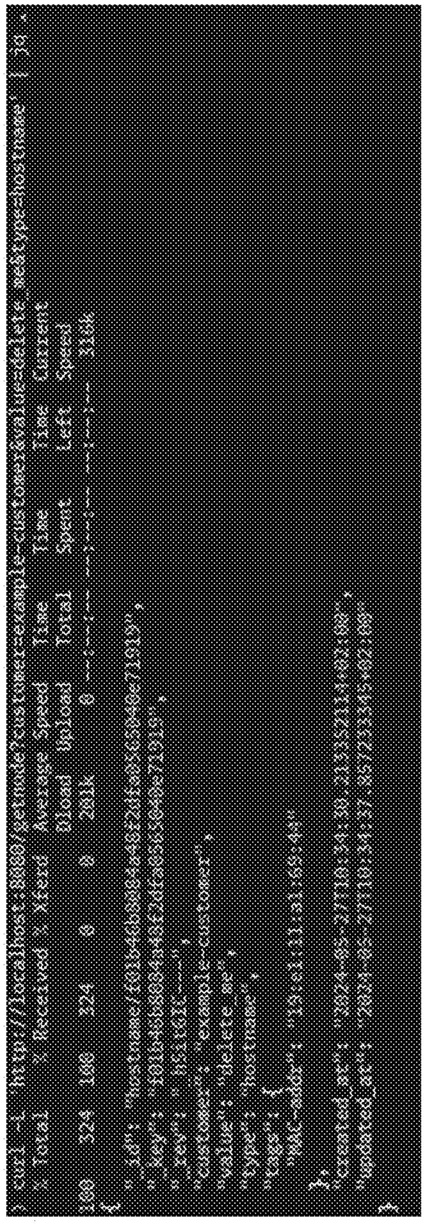
FIG. 5 illustrates more details of looking up an asset.

FIG. 5 illustrates a process to add a node with hostname "delete_me" into the asset database. FIG. 6 illustrates the API call to delete the asset added in FIG. 5. FIG. 7 is a sequence of code showing that a subsequent search for the node "delete_me" does not return any results.

Figure 8:
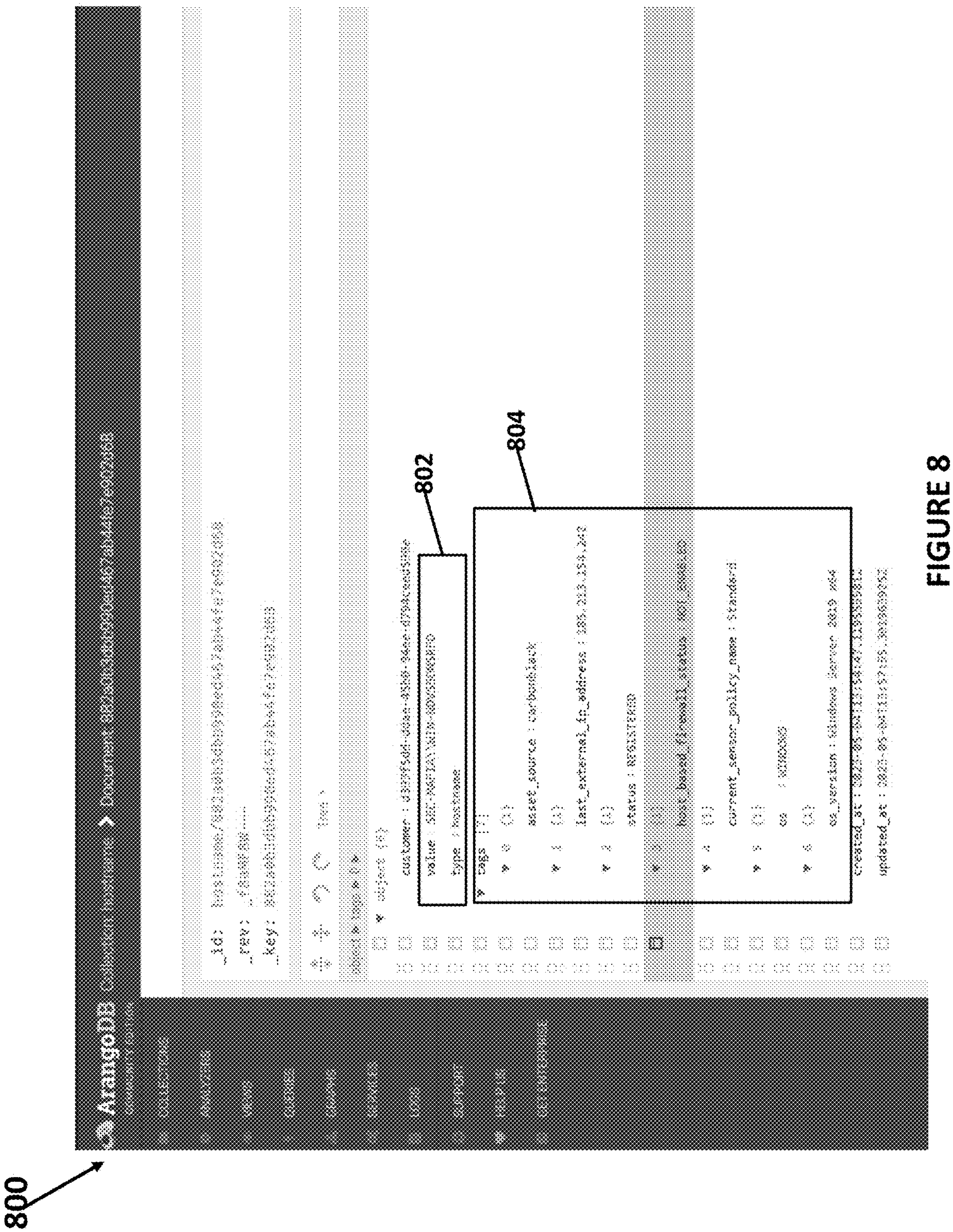
FIG. 8 illustrates a display of the related assets in the asset relationship storage.

FIG. 8 illustrates a display 800 of the related assets in the asset relationship storage. In the example in FIG. 8, a hostname 802 has a value shown in FIG. 8 that is a first piece of information about that asset. As shown in FIG. 8, there may be one or more tags 804 associated with the original piece of asset data (the hostname is this example) that contain additional pieces of data (such as asset source, last external IP address, status, host based firewall status, current sensor policy name and OS (operating system) and OS version in the example in FIG. 8) that may be queried and retrieved from the asset relationship storage. Thus, a user may know the hostname and then retrieve all of the other related data from the asset relationship storage. Alternatively, the user may know a last IP address of an asset and then retrieve the other asset data such as the hostname. The retrieval of the other asset data from the system allows the user to better assess a risk of the asset or connect together two pieces of otherwise unrelated asset data.

Figure 9:
FIG. 9 illustrates an example of JSON code with the related assets.

As an example, if a user wanted to know what other types of "assets" are related to the hostname "desktop-49dq0jc" on client "51dd709a-1342-477d-b0ee-1147068dafd2", the user can make a request/query to the graph database such as:

<BASE_URL>/getnoderelation?customer=51dd709a-1342-477d-b0ee-1147068dafd2&value=desktop-49dq0jc&type=hostname This request/query, in one embodiment, returns a list 900 of the asset and its related characteristics (the IP address in this example in FIG. 9) that may be in the form of JSON code in one embodiment shown in FIG. 9. As shown in FIG. 9, the list includes the known asset value (the hostname) other related asset values and relationships.

Figure 10:
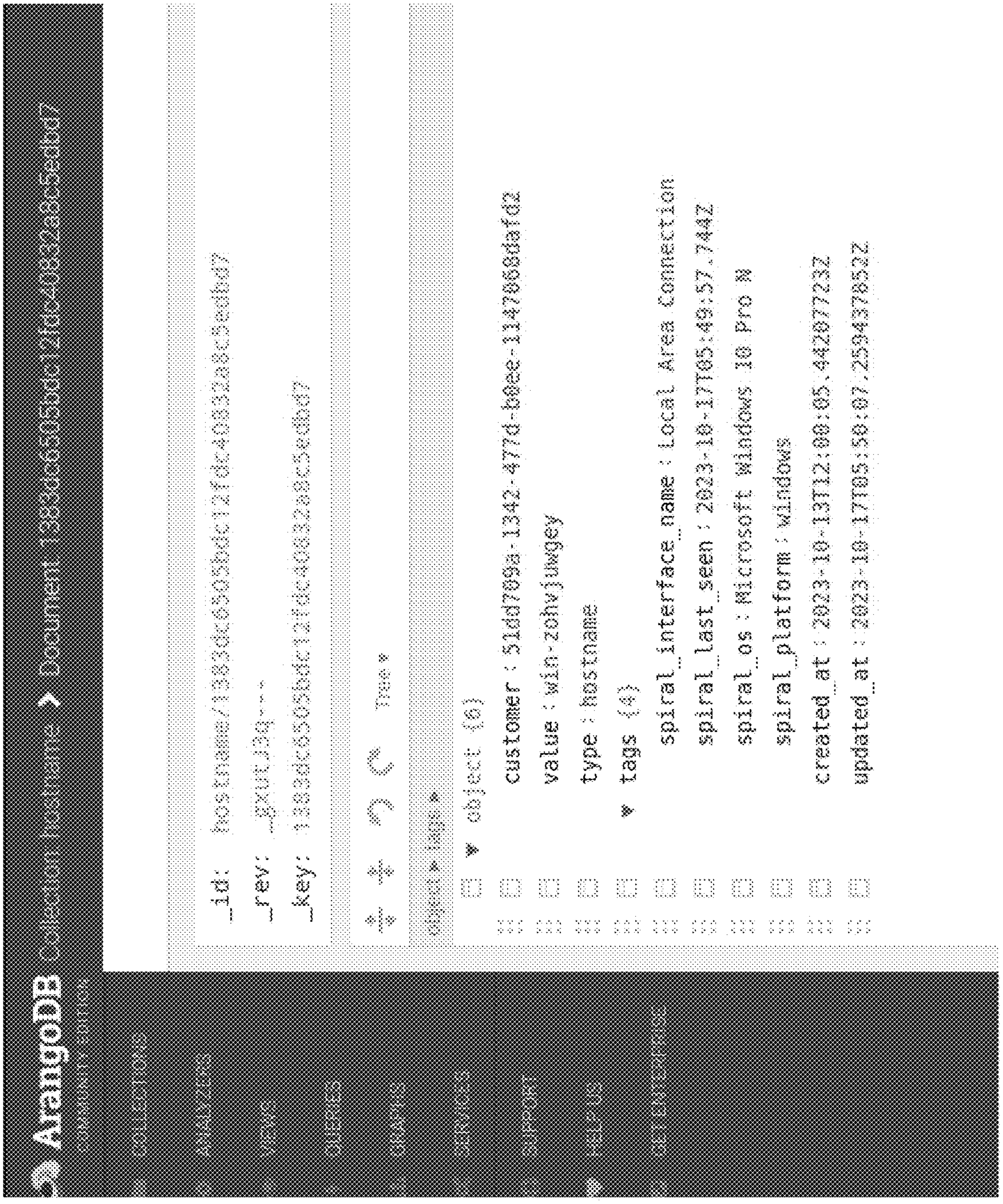
FIGS. 10-11 are an example of a user interface and code for getting nodes/assets from the asset relationship storage.
Figure 11:
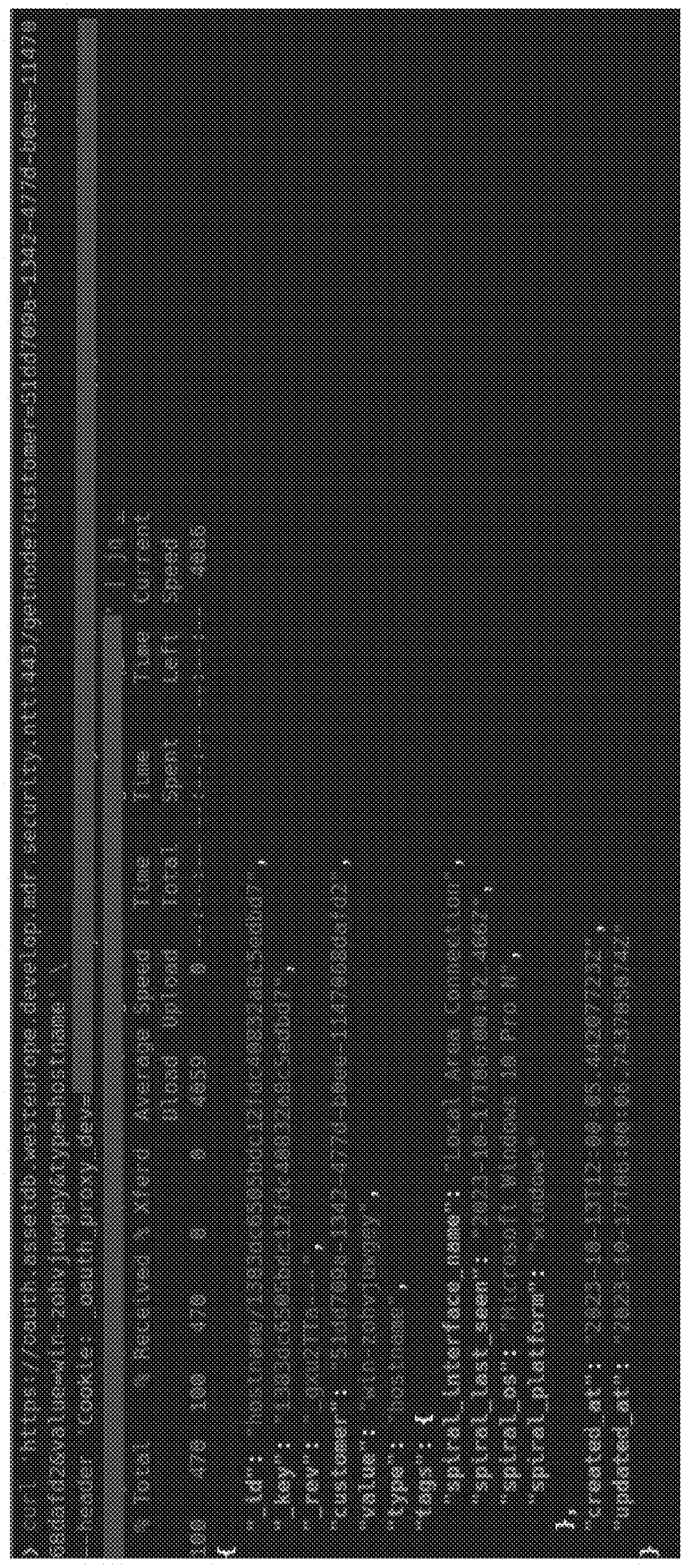
Figure 12:
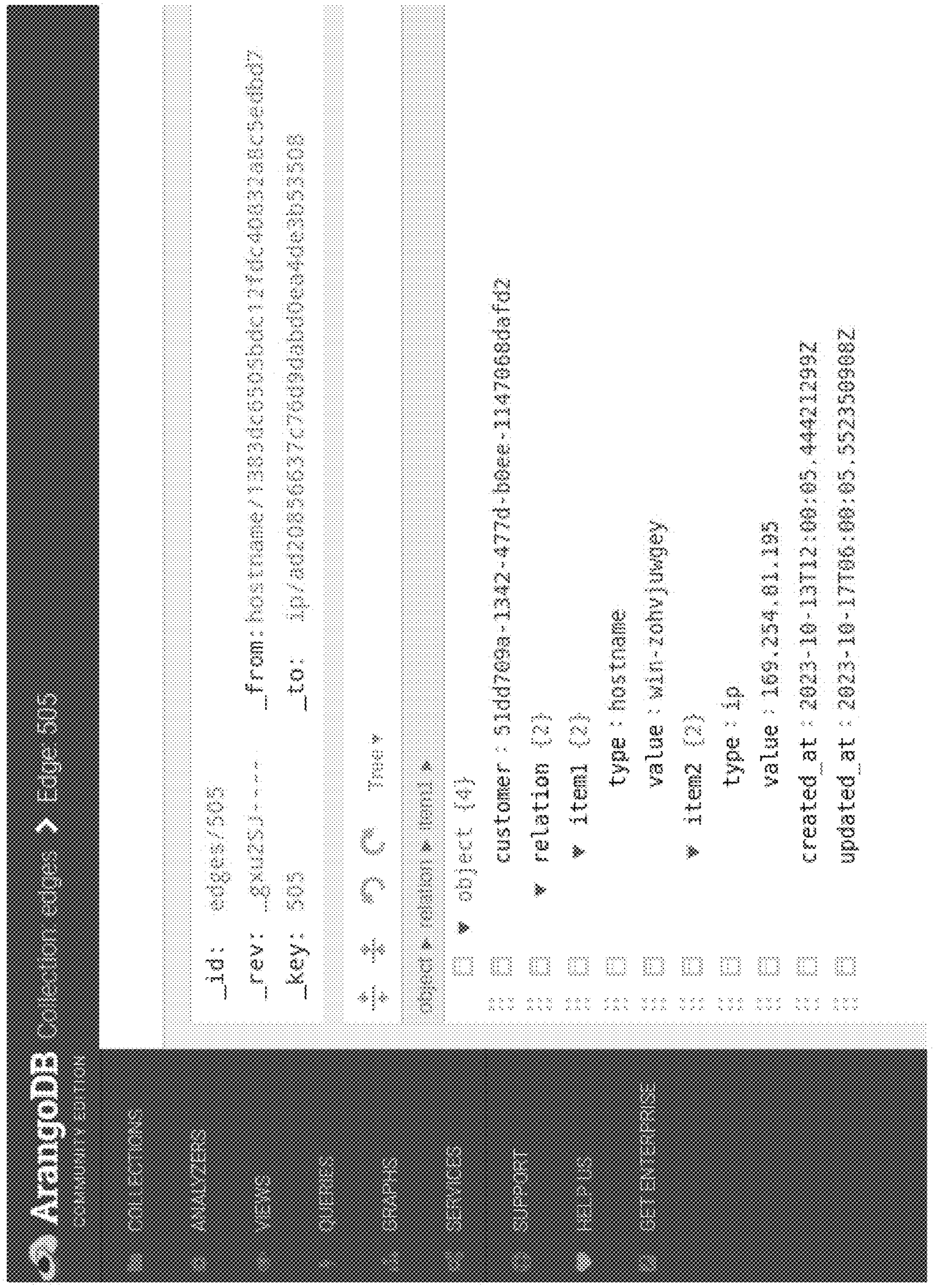
FIGS. 12-13 are an example of a user interface and code for getting edges/relationships from the asset relationship storage.
Figure 13:
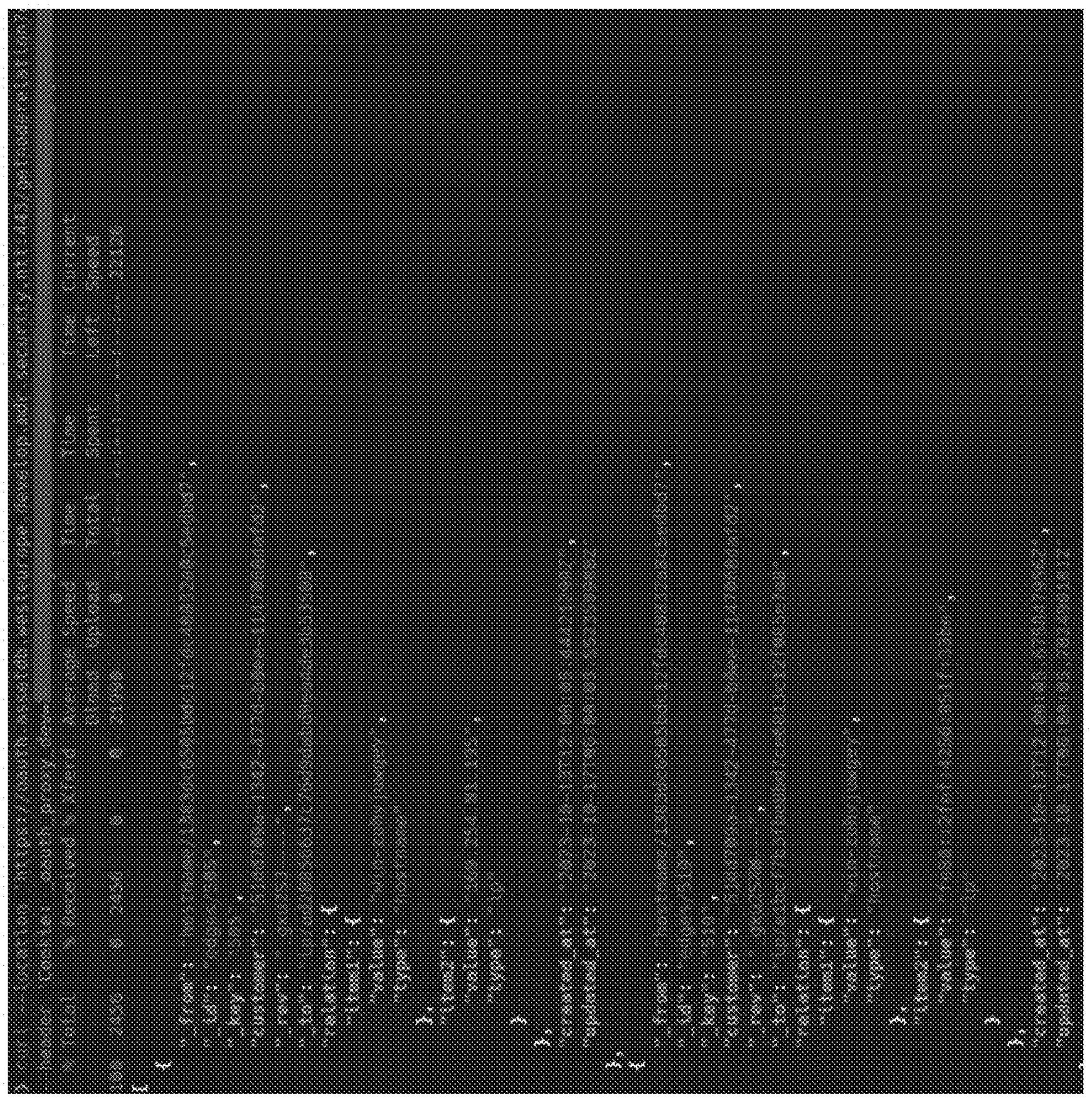
Figure 14:
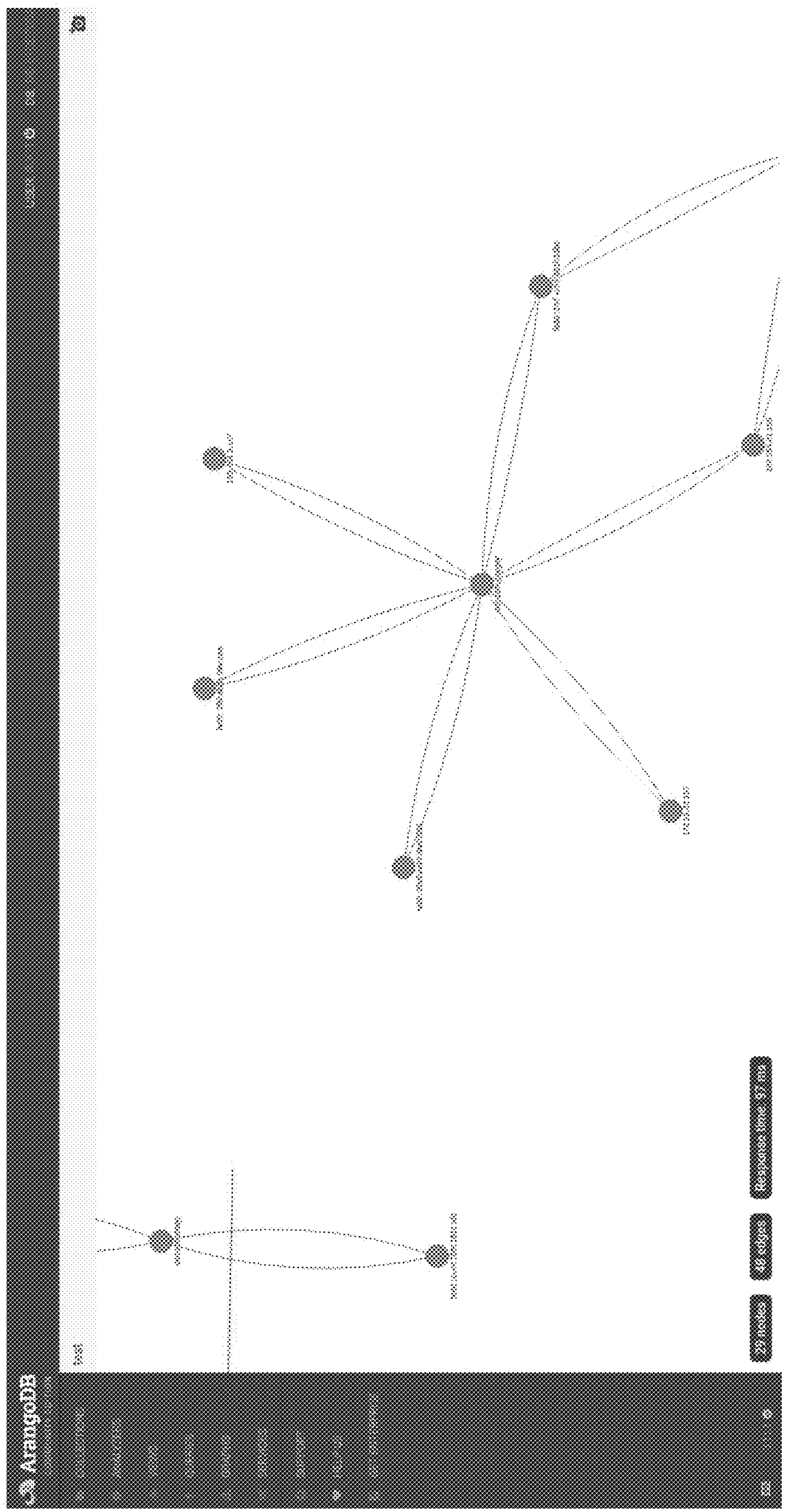
FIG. 14 illustrates an example of the assets and their relationships displayed in a graph database user interface.

FIGS. 10-11 are an example of a user interface of the asset store (FIG. 10) and a piece of code (FIG. 11) for getting nodes/assets from the asset relationship storage. As shown in this example, note that any type of asset and/or related assets may be stored and related in the system. In the example in FIGS. 10-11, the asset is a hostname and the tags/related assets may be spiral related assets which are different from the other examples provided herein. FIGS. 12-13 are an example of a user interface (FIG. 12) and code (FIG. 13) for getting edges/relationships from the asset relationship storage. Finally, FIG. 14 illustrates an example of the assets and their relationships displayed in a graph database user interface. However, it is understood that the asset storage may be any type of storage including databases (software and hardware based), memory and the like and that Arango DB is just one example of a graph database that may be used for the system.

The system 100 shown in FIG. 1 may be a stand alone asset management system that may be queried for asset information. Alternatively, authorized third parties may use an application programming interface (API) to request asset data and receive the asset data results back from the system. Furthermore, the asset management system may be integrated into other system such as malware detection or tracking systems and other systems. Each of these other systems may have a tool/component/module that can, via an API or other mechanism, reach out to the asset manager 160B to query the asset storage to determine if there is more data available for a given asset to "enrich" the knowledge about the asset for various purposes.

The foregoing description, for purpose of explanation, has been with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include and/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, hand-held or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general-purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software, and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

What is claimed is:

1. An asset database apparatus, comprising:

a computer system having a graph database having a plurality of nodes wherein each node represents a piece of data about an asset and a plurality of edges wherein each edge represents a relationship between two nodes that each contain a piece of data about the same asset, the asset being an information technology/internet protocol asset having one of a hostname of the asset, an IP address associated with the asset, a piece of software installed on the asset or a username of the asset;

the computer system having a processor that executes an asset manager connected to the graph database that manages access to the graph database, adds or deletes asset data stored in the graph database and enforces a time to live for each piece of data for an asset stored in the graph database;

an asset relationship application programming interface (API) by which a user may access the asset manager; and the asset manager being configured to receive a request via the API when a user discovers that a first asset stored in a first node of the graph database and a second asset stored in a second node of the graph database are related, to add a relationship between the first asset and the second asset and to add an edge in the graph database between the first node and the second node.

2. The apparatus of claim 1, wherein the asset manager automatically deletes a particular asset when the time to live of the particular asset has been exhausted.

3. The apparatus of claim 1, wherein the asset manager adds a new asset into the graph database by adding a new node into the graph database.

4. The apparatus of claim 3, wherein the asset manager receives a new piece of data about an asset that is stored in the graph database, generates a new node for the new piece of data about the asset and generates an edge between the node of the asset that is stored in the graph database and the new node for the new piece of data about the asset.

5. The apparatus of claim 1, wherein the asset manager gathers data about one or more assets and inserts the data about the one or more assets into the graph database.

6. The apparatus of claim 1, wherein a time period of the time to live is seven days.

7. The apparatus of claim 1, wherein the asset manager further comprises an artificial intelligence model that responds to a query about the asset in the graph database.

8. A method, comprising:

storing, in a plurality of nodes and a plurality of edges of a graph database wherein each node represents a piece of data about an asset and each edge represents a relationship between two nodes that each contain a piece of data about the same asset, an asset and data about the asset in nodes and edges of the graph database, the asset being an information technology/internet protocol asset having one of a hostname of the asset, an IP address associated with the asset, a piece of software installed on the asset or a username of the asset;

managing, by an asset manager connected to the graph database, access to the graph database including adding or deleting asset data stored in the graph database;

enforcing, by the asset manager, a time to live for each piece of data for an asset stored in the graph database;

accessing, by a user using an asset relationship application programming interface (API), the asset manager;

receiving, via the API to the asset manager, a request when a user discovers that a first asset stored in a first node of the graph database and a second asset stored in a second node of the graph database are related, to add a relationship between the first asset and the second asset; and adding, by the asset manager, an edge in the graph database between the first node and the second node.

9. The method of claim 8, wherein enforcing the time to live further comprises automatically deleting a particular asset when the time to live of the particular asset has been exhausted.

10. The method of claim 8 further comprising adding, by the asset manager, a new asset into the graph database by adding a new node into the graph database.

11. The method of claim 10 further comprising receiving, by the asset manager, a new piece of data about an asset that is stored in the graph database, generating, by the asset manager, a new node for the new piece of data about the asset and generating, by the asset manager, an edge between the node of the asset that is stored in the graph database and the new node for the new piece of data about the asset.

12. The method of claim 8 further comprising gathering, by the asset manager, data about one or more assets and inserting, by the asset manager, the data about the one or more assets into the graph database.

13. The method of claim 8, wherein a time period of the time to live is seven days.

14. The method of claim 8 further comprising responding, by an artificial intelligence model that is part pf the asset manager, to a query about the asset in the graph database.

15. A method for adding a new asset to an asset database using a graph database having a plurality of nodes and a plurality of edges wherein each node represents a piece of data about an asset and each edge represents a relationship between two nodes that each contain a piece of data about the same asset, the method comprising:

receiving, by an asset manager executed by a processor of a computer system connected to the graph database, a piece of data about an asset to be stored in the graph database, the asset being an information technology/internet protocol asset having one of a hostname of the asset, an IP address associated with the asset, a piece of software installed on the asset or a username of the asset;

performing, by the asset manager executed by a processor of the computer system, one or more validations on piece of data about the asset;

generating, by the asset manager executed by a processor of the computer system if the piece of data about the asset is validated, a new node in the graph database for the piece of data for the asset;

adding, by the asset manager executed by a processor of the computer system, an edge to the graph database between the node that already stores the asset and the new node for the piece of data for the asset; and setting, by the asset manager executed by a processor of the computer system, a time to live for the piece of data stored in the new node.

16. The method of claim 15 further comprising automatically deleting the piece of data for the asset when the time to live of the piece of data for the asset has been exhausted.

17. The method of claim 15 further comprising gathering, by the asset manager, data about one or more assets and inserting, by the asset manager, the data about the one or more assets into the graph database.

18. The method of claim 15, wherein a time period of the time to live is seven days.

* * * * *